United States Patent [19]

Vesterinen

[11] Patent Number: 5,568,545
[45] Date of Patent: Oct. 22, 1996

[54] CENTRALIZED COMMAND SYSTEM FOR A TELECOMMUNICATIONS NETWORK

[75] Inventor: Timo Vesterinen, Espoo, Finland

[73] Assignee: Nokia Telecommunications Oy, Espoo, Finland

[21] Appl. No.: 387,708

[22] PCT Filed: Aug. 12, 1993

[86] PCT No.: PCT/FI93/00316

§ 371 Date: Apr. 12, 1995

§ 102(e) Date: Apr. 12, 1995

[87] PCT Pub. No.: WO94/05123

PCT Pub. Date: Mar. 3, 1994

[30] Foreign Application Priority Data

Aug. 14, 1992 [FI] Finland .................................. 923670

[51] Int. Cl.[6] ............................. H04M 7/00; H04M 3/00
[52] U.S. Cl. ......................... 379/333; 379/219; 379/230; 379/269
[58] Field of Search ..................... 379/269, 333, 379/334, 335, 219, 220, 221, 229, 230

[56] References Cited

U.S. PATENT DOCUMENTS 4,736,409  5/1988  Hasegawa et al. ...................... 379/269
4,747,130  5/1988  Ho .......................................... 379/269
4,853,956  8/1989  Astmann ................................. 379/269
4,972,183  11/1990  Kuhlmann et al. .................... 370/17 X
5,455,824  10/1995  Okuyama et al. ................... 379/333 X

OTHER PUBLICATIONS

Tanenbaum: "Computer Networks", 1989 — Prentice–Hall International Inc, p. 2, line 23–line 40.

Primary Examiner—Jeffery Hofsass
Assistant Examiner—Harry S. Hong
Attorney, Agent, or Firm—Cushman Darby & Cushman, L.L.P.

[57] ABSTRACT

A centralized command system for a telecommunications network, in which system a central exchange of a telecommunications network and network elements, such as local concentrators, under its control form an entity which is controllable in a centralized manner from the central exchange by means of user interfaces of individual concentrators. The system includes a program command structure in which the command sequences required by each task and directed to the central exchange and/or one or more network elements are combined so as to form a single logical task entity, or macro, on the basis of which the system automatically initiates embedded terminal sessions with the necessary network elements and executes the commands necessary for performing the given task.

7 Claims, 1 Drawing Sheet

CENTRALIZED COMMAND SYSTEM FOR A TELECOMMUNICATIONS NETWORK

BACKGROUND OF THE INVENTION

The invention relates to a centralized command system for a telecommunications network, in which system a central exchange of a telecommunications network and network elements, such as local concentrators, under its control form an entity which is controllable in a centralized manner from the central exchange by means of user interfaces of individual concentrators.

It is becoming more and more general to use concentrators of different levels in connection with digital exchanges in public telecommunications networks. By the use of concentrators, subscribers can be effectively gathered from a wide area to a large tandem or regional exchange. Concentrators are placed in villages and, as the capacity increases, presently even in small towns.

A central exchange with its concentrators can thus offer digital telephone services over a wide area. From the point of view of an operator, such a concept has several advantages. Subscribers can be numbered freely on the entire wide exchange area. The operation of the exchange is centralized, and the whole large entity can be treated as one exchange. All management tasks, such as the control of subscribers, or the updating and changing of software, can be effected in a centralized manner.

The central exchange and its concentrators are operated in a centralized manner from the central exchange. On the other hand, the concentrators are required to operate very independently, particularly when connections to the central exchange are broken. A concentrator must be capable of switching internal traffic without the control of the central exchange, and it must be possible to store the computed data produced by it during the break.

There are two alternative ways of implementing concentrators. A concentrator can be developed from an independent exchange or from a simpler subscriber level. When it is developed from an independent exchange, a large number of features of independent operation can easily be included in it. The problem is rather how to arrange uniform operation functions in such a manner that a plurality of entities "independent" from an operational point of view are seen by the user as in a single large exchange.

In practice, this often means that the operation and control tasks pertaining to the entire network are divided into several subtasks to be carried out in different parts of the network (i.e. in concentrators). The management of the whole task requires strict control of the subtasks and an ability to cope with many fault situations, which may occur when only part of the tasks can be carried out in a controlled manner.

SUMMARY OF THE INVENTION

The object of the invention is a method by which centralized control can be arranged in a controlled and reliable manner even though the central exchange and the concentrators are independent entities and contain their own user interfaces and command programs. The method of the invention is characterized in that the system comprises a program command structure in which the command sequences required by each task and directed to the central exchange and/or one or more network elements are combined so as to form a single logical task entity, or macro, on the basis of which the system automatically initiates embedded terminal sessions with the necessary network elements and executes the commands necessary for performing the given task.

BRIEF DESCRIPTION OF THE DRAWING

In the following the invention will be described in greater detail by means of examples and with reference to the accompanying drawing, in which.

DETAILED DESCRIPTION

Figure 1:
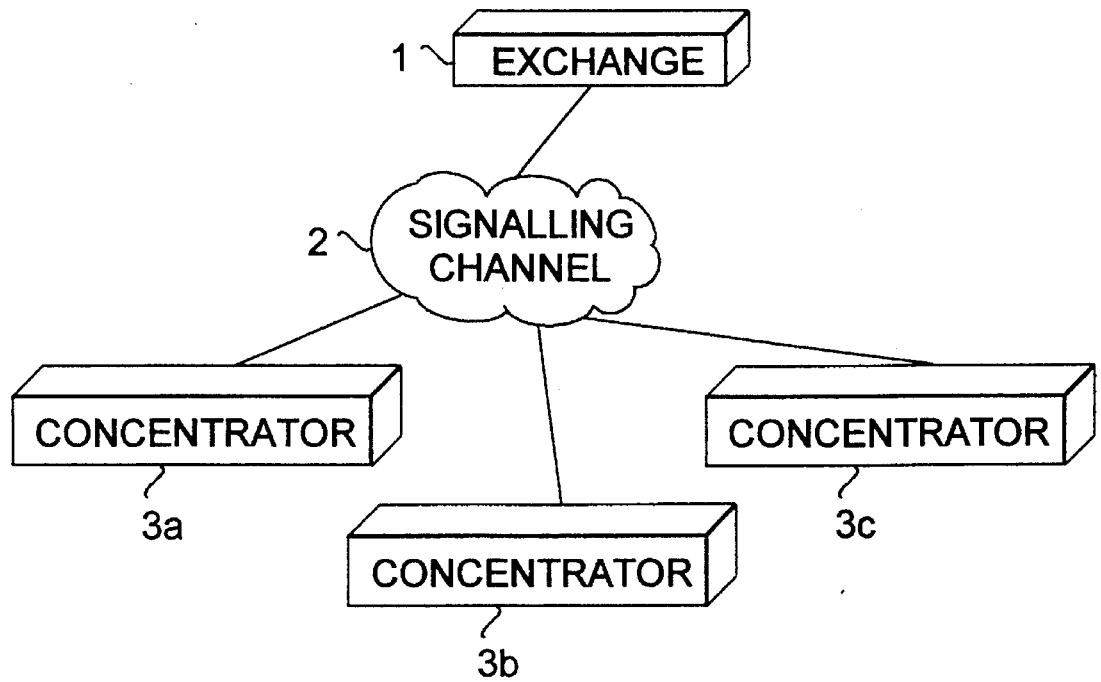
FIG. 1 shows the structure of a modern telecommunications network.

FIG. 1 shows the structure of a digital telecommunications network with respect to the control connection between an exchange 1 and network elements, i.e. concentrators 3a–3c. The exchange and the concentrators transfer control data between themselves through a common signalling channel 2 (YKM). It is obvious that the efficiency and controllability of the control of the concentrators 3a–3c is essentially dependent on the command system used in the exchange, as in various tasks it is necessary to control several concentrators which perform subtasks independently.

The operating functions of a concentrator are normally performed from the central exchange, in its operation control computer or in a separate centralized operation control centre, by the use of the operation control interfaces of the concentrators. The use of independent operation control interfaces renders it possible to use the concentrators locally. According to the invention, at least the most essential command sequences are combined to form command macros, implemented using an existing command language. The command languages used are exchange specific in the various types of exchanges, wherefore a person skilled in the art should know to which exchange each command language is applicable.

A command macro usually forms a single task entity, in which several commands are executed in one or more network elements, i.e. concentrators. It is not necessary to update the data and files which are changed on account of the commands to the other concentrators, as each concentrator contains only data relating to its own interfaces and buses. Only the analysis tables pertaining to numbering must always be updated both in the central exchange and in the concentrators affected by any changes in the numbering of the subscribers.

Figure 2:
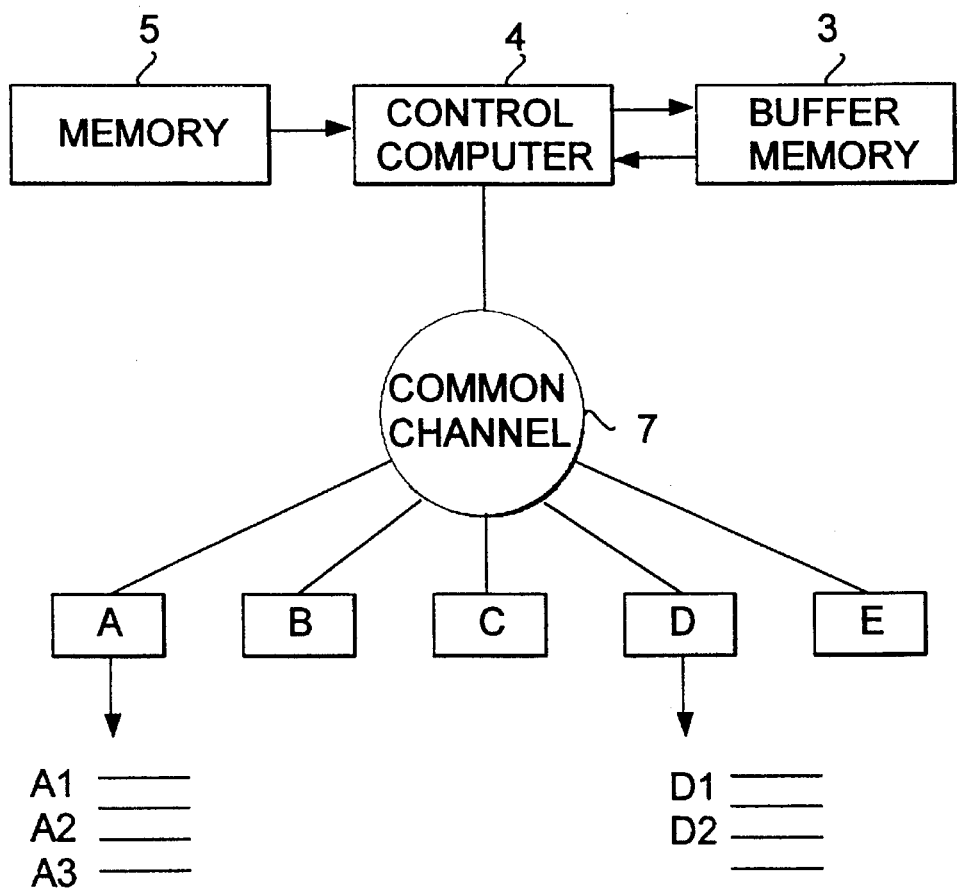
FIG. 2 is a block diagram of the system of the invention.

FIG. 2 illustrates the system according to the invention as a block diagram, in which reference number 4 indicates an operation control computer of the telephone exchange 1 according to FIG. 1, number 5 indicates its program memory, and number 6 its buffer memory. In addition, the system comprises a common channel 7 for the concentrators A . . . E under the computer 4 and its telecommunications network exchange.

According to the system of the invention, the performance of a task entity is thus based on a command structure where several command sequences are combined to form macro commands. Before a macro task is started, terminal sessions are opened with each target system of the macro, and all of the established connections are maintained during the performance of the whole macro. Before the tasks are started, a network element status query command is run in each system in order for the status of the connection and the network element to be ensured. Macros thus contain commands directed to individual network components, e.g. concentrators and other independent exchanges under centralized control; taken together, the commands form the performance of a task covering the whole network. An example of a task to be carried out is the transfer of a subscriber from one location to another, from the area of the concentrator A to that of the concentrator D. In this case the overall task comprises the following subtasks:

creating a new subscriber in concentrator D, writing the control data of the new subscriber to the files of the central exchange (to the memory 4 of the central unit), transferring counter data from concentrator A to concentrator D as its initial values, destroying the subscriber data in concentrator A.

In this case, the macro thus consists of command sequences in the memory 5 of the computer 4, said sequences containing individual commands, A1 ... A3, D1 ... D2, for the concentrators A and D of FIG. 2. This requires a centralized command system of the invention in the central exchange, the system being capable of running commands simultaneously in several different target systems. The macro is named for the user in such a manner that it resembles individual commands so that the necessary command sessions with the target systems are embedded with respect to the user.

According to the invention, the task management in fault situations is effected as follows:

the operation control computer of the central exchange keeps a log of all tasks started by the central exchange and run in the different network elements, the tasks (target commands) can be stored in the buffer 6 on account of a temporary fault, e.g. in the connection, to wait for the continuance of the execution. In some cases it is possible to continue the execution of a macro in a normal way even though one or more tasks are in a wait state. These tasks will be carried out automatically once the connection is in order again. However, it is often impossible to execute macro commands subsequent to a command in a wait state if the following tasks or one of them is dependent on the responses of the task in a wait state. In this case, the execution of the macro is not continued but the entire macro is transferred to the buffer memory 6 and put in a wait state.

The log kept by the computer of the central exchange has knowledge of which subtasks have been carried out and from where the macro is to be continued after the fault is corrected. It is necessary to keep a log, as the task management requires that the user should be informed accurately of all steps of performing the entire task, of the subtasks being transferred to the buffer, etc. The network element-specific log is preferably stored in an executable form, which e.g. after a break, can be fed again as such to the network element for execution.

The tasks transferred to the buffer memory 6 have substates which control the execution. Examples of the substates are an automatic execution state, in which the task is performed automatically and immediately once the fault is corrected, and an execution wait state, in which the tasks are transferred for execution only after a command has been issued by the operator. The last-mentioned feature allows commands to be run without the presence of equipment, which is considered important in telecommunications companies. For instance, new subscribers may be defined by commands although the actual concentrator is not yet set up or connected.

In order to ensure the performance of tasks, it is possible in the system according to the invention to run parallel (embedded) sessions between the central exchange and the concentrators. The centralized compiler of macro commands in the central exchange, i.e. the operation control computer 4 or a separate operation control centre, establishes command connections immediately at the beginning of the performance to all the concentrators to which macro tasks are directed. Although the subtasks proceed sequentially in the different concentrators, parallel connections are maintained to all of the concentrators during the execution of the entire macro.

According to the invention, the tasks can alternatively be carried out in two steps, whereby even greater reliability is achieved. This involves the introduction of the concept of commitment, known from database systems. In the first step, the tasks are carried out as normal, but the database system of the concentrator does not commit itself to the change. After the central exchange has run all tasks in each concentrator, the first step is followed by the second step, where the operation control computer of the central exchange requests each concentrator in turn to commit itself to the changes required by the tasks. Each database system then effects the activation of the task permanently. If the performance of a macro task fails in one of the network elements in the second step, the changes caused by the commands executed in the first step with regard to said network element can be cancelled and managed as a normal fault situation.

This preliminary execution commitment process works without that the command software of the concentrators is changed in cases where a correct database system is in use and the changes in the commands are directed to the data controlled by the database. In such cases, the commitment can be implemented simply between the macro system of the central exchange and the database system of the concentrators, whereby numerous command programs do not have to be affected.

The command structures embodying the system of the invention (i.e. macros) present themselves to the user in the same way as separate commands. The macros that are in use are included in a menu which presents the macro tasks. To ensure harmonization, the command system accepts only macros that are created in a standardized manner and include presentation of themselves (the part of the menu that relates to the macro).

To a person skilled in the art it is obvious that the different embodiments of the invention are not restricted to the examples given above but can be modified freely within the scope of the appended claims.

I claim:

1. A centralized command system for a telecommunications network, comprising:

a central exchange of a telecommunications network;

network elements under control of said central exchange constituting an entity which is controllable in a centralized manner from the central exchange by means of user interfaces of individual concentrators;

a program-based command structure in which the command sequences required by each task and directed to the central exchange and/or one or more of said network elements are combined so as to form a single logical task entity, or macro, having a respective target system, on the basis of which said command system automatically initiates embedded terminal sessions with said network elements and executes commands necessary for performing the respective task;

said program-based command structure being configured to open a respective terminal session with each respective target system of each said logical task entity or macro, before starting the respective logical task entity or macro, and to maintain all resulting connections in parallel during execution of the whole of the respective logical task or macro.

2. A centralized command system for a telecommunications network, comprising:

a central exchange of a telecommunications network;

network elements under control of said central exchange constituting an entity which is controllable in a centralized manner from the central exchange by means of user interfaces of individual concentrators;

a program-based command structure in which the command sequences required by each task and directed to the central exchange and/or one or more of said network elements are combined so as to form a single logical task entity, or macro, having a respective target system, on the basis of which said command system automatically initiates embedded terminal sessions with said network elements and executes commands necessary for performing the respective task;

said program-based command structure being configured to open a respective terminal session with each respective target system of each said logical task entity or macro, before starting the respective logical task entity or macro, and to maintain all resulting connections in parallel during execution of the whole of the respective logical task or macro; and the program-based command structure being configured to run a network element status query command in each respective target system of each said logical task entity or macro, before starting the respective logical task entity or macro, for ensuring connection and status of the respective network element.

3. A centralized command system for a telecommunications network, comprising:

a central exchange of a telecommunications network;

network elements under control of said central exchange constituting an entity which is controllable in a centralized manner from the central exchange by means of user interfaces of individual concentrators;

a program-based command structure in which the command sequences required by each task and directed to the central exchange and/or one or more of said network elements are combined so as to form a single logical task entity, or macro, on the basis of which said system automatically initiates embedded terminal sessions with said network elements and executes commands necessary for performing the respective task;

said program-based command structure being configured to cause commands of each said logical task entity or macro to be executed in two steps in such a manner that in a first step, all commands are run through in the respective said network elements without the network elements committing themselves to the changes required by the commands until all network elements have been gone through, and in a second step, the respective said network elements commit themselves to the commands run through in the first step.

4. A system according to claim 3, wherein:

said program-based command structure is further configured such that if the execution of a task fails in a network element in said second step, the changes caused by the commands executed in the first step are cancelled with regard to the respective said network element.

5. A centralized command system for a telecommunications network, comprising:

a central exchange of a telecommunications network;

network elements under control of said central exchange constituting an entity which is controllable in a centralized manner from the central exchange by means of user interfaces of individual concentrators;

a program-based command structure in which the command sequences required by each task and directed to the central exchange and/or one or more of said network elements are combined so as to form a single logical task entity, or macro, on the basis of which said system automatically initiates embedded terminal sessions with said network elements and executes commands necessary for performing the respective task; and a network element specific transaction log which keeps a register of the commands executed in each element and attempts to execute the commands, whereby the log keeps a record of commands which for some reason have not been executed, and that the network element specific transaction log is stored in an executable form, which can be run as such, for the execution of commands that have not been executed in the corresponding said network elements.

6. A system according to claim 5, further comprising:

a buffer memory for buffering network element-specific tasks, for subsequent execution, and operation states controlling the further execution of delayed tasks.

7. A system according to claim 6, wherein:

said operation states include two operation states controlling further execution of delayed tasks, one of them transferring the commands to be run immediately as soon as possible, and the other keeping the respective commands in a wait state until a system operator issues an execution command.

\* \* \* \* \*